(12) United States Patent
Schroth et al.

(10) Patent No.: US 10,576,565 B2
(45) Date of Patent: Mar. 3, 2020

(54) LASER WELDING OF COPPER WITH REACTION MATERIALS

(71) Applicant: GM GLOBAL TECHNOLOGY OPERATIONS LLC, Detroit, MI (US)

(72) Inventors: James G. Schroth, Troy, MI (US); Thomas A. Perry, Bruce Township, MI (US); Hongliang Wang, Sterling Heights, MI (US); Chen Zhou, Troy, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 615 days.

(21) Appl. No.: 15/273,923

(22) Filed: Sep. 23, 2016

(65) Prior Publication Data

US 2018/0085855 A1     Mar. 29, 2018

(51) Int. Cl.
| | | |
|---|---|---|
| B23K 26/211 | (2014.01) |
| B23K 1/00 | (2006.01) |
| B23K 1/18 | (2006.01) |
| B23K 1/005 | (2006.01) |
| B23K 101/32 | (2006.01) |
| B23K 103/12 | (2006.01) |

(52) U.S. Cl.
CPC .......... *B23K 1/0006* (2013.01); *B23K 1/0056* (2013.01); *B23K 1/18* (2013.01); *B23K 2101/32* (2018.08); *B23K 2103/12* (2018.08)

(58) Field of Classification Search
CPC ...... B23K 1/0006; B23K 1/0056; B23K 1/19; B23K 2101/32; B23K 2103/12; B23K 21/0006

USPC ................ 219/121.63, 145.1, 121.85, 79, 76
See application file for complete search history.

(56) References Cited

U.S. PATENT DOCUMENTS

| | | | |
|---|---|---|---|
| 4,281,841 A | 8/1981 | Kim et al. | |
| 5,272,309 A * | 12/1993 | Goruganthu | ....... B23K 26/0604 219/121.63 |
| 6,818,857 B1 * | 11/2004 | Cho | .................... B23K 26/0604 219/121.64 |
| 8,523,045 B2 | 9/2013 | Perry et al. | |
| 8,590,768 B2 | 11/2013 | Sigler et al. | |
| 2004/0182843 A1 * | 9/2004 | Schreiber | ............. B23K 1/0008 219/121.85 |
| 2010/0258537 A1 * | 10/2010 | Sigler | .................. B23K 20/023 219/118 |
| 2011/0206940 A1 * | 8/2011 | Engert | ................... B23K 37/00 428/600 |

(Continued)

*Primary Examiner* — Tu B Hoang
*Assistant Examiner* — Tiffany T Tran
(74) *Attorney, Agent, or Firm* — Vivacqua Law, PLLC

(57) ABSTRACT

A method of forming a weld interface between a first workpiece and a second workpiece includes arranging a reactive braze material at a first joining surface of the first workpiece. The reactive material is selected to react upon being heated to a temperature below the solidus temperature of the first and second workpieces to form a liquid-containing reaction product. Furthermore, an assembly is prepared of the first workpiece and the second workpiece with the first joining surface of the first workpiece and a second joining surface of the second workpiece separated by the reactive material. The second workpiece is then heated with a first laser beam following a first path and with a second laser beam following a second path.

16 Claims, 3 Drawing Sheets

(56) References Cited

U.S. PATENT DOCUMENTS

| | | | |
|---|---|---|---|
| 2012/0273557 A1* | 11/2012 | Perry | B23K 35/302 |
| | | | 228/198 |
| 2013/0193124 A1* | 8/2013 | Peters | B23K 26/20 |
| | | | 219/121.63 |
| 2013/0327749 A1* | 12/2013 | Denney | B23K 9/0956 |
| | | | 219/137 PS |
| 2014/0034622 A1* | 2/2014 | Barrett | B23K 26/24 |
| | | | 219/121.64 |
| 2014/0061185 A1* | 3/2014 | Schindele | B23K 20/128 |
| | | | 219/617 |
| 2016/0008911 A1 | 1/2016 | Schroth et al. | |
| 2016/0008912 A1 | 1/2016 | Schroth et al. | |
| 2016/0023957 A1* | 1/2016 | Landwehr | C04B 37/003 |
| | | | 156/272.6 |
| 2016/0218603 A1* | 7/2016 | Schroth | B23K 9/0008 |
| 2016/0284449 A1* | 9/2016 | Haq | B32B 27/08 |
| 2016/0344269 A1* | 11/2016 | Yabe | H02K 3/50 |
| 2017/0312853 A1* | 11/2017 | Kabelitz | B23K 26/32 |

* cited by examiner

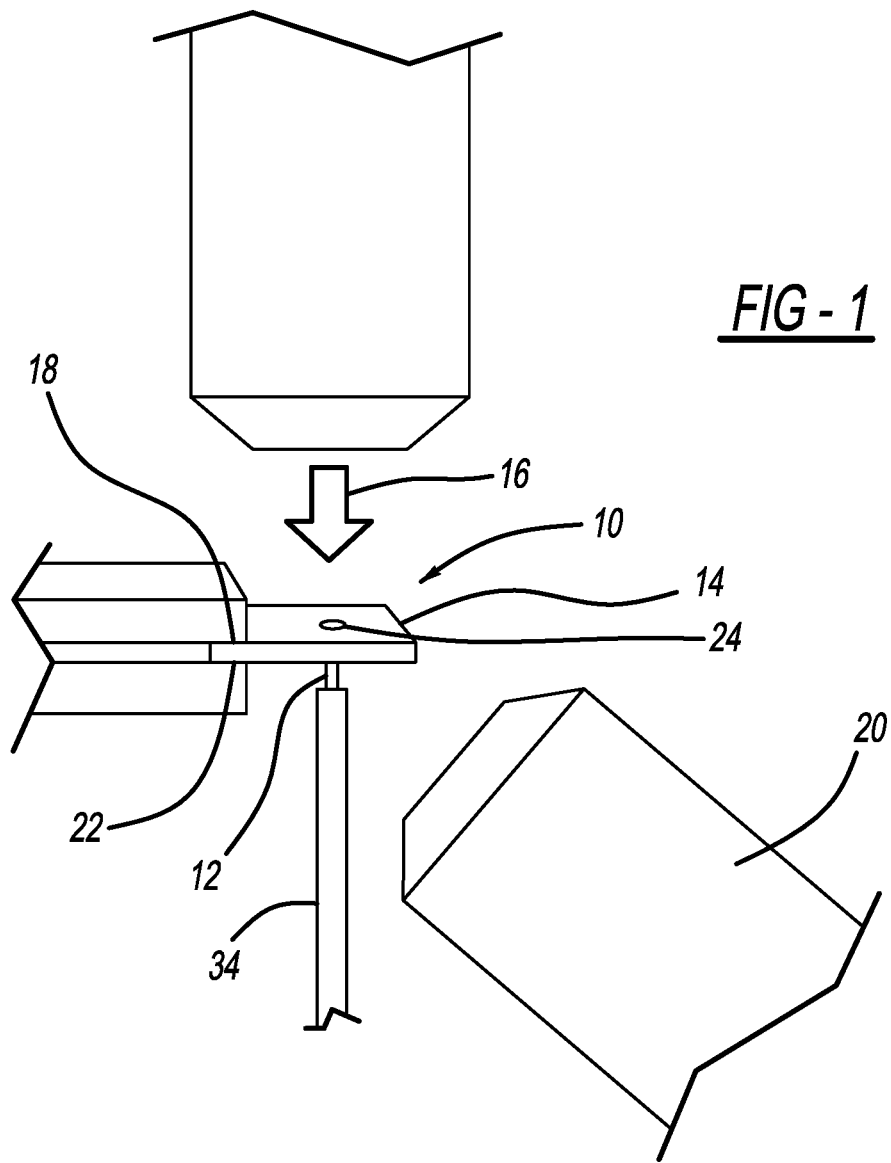
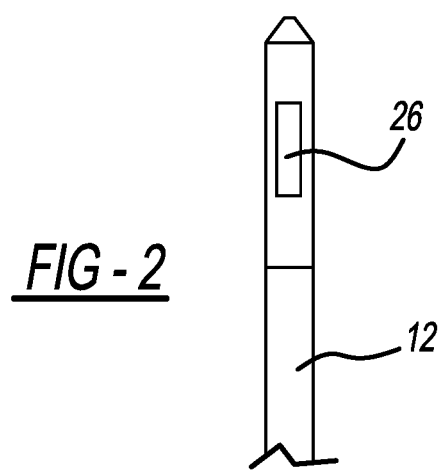

LASER WELDING OF COPPER WITH REACTION MATERIALS

FIELD

The present disclosure relates to a welding process utilizing reaction materials for joining copper workpieces.

INTRODUCTION

The statements in this section merely provide background information related to the present disclosure and may not constitute prior art.

It is often necessary to securely join workpieces for use in purposes in automotive vehicles and the like. Welding is frequently used for joining workpieces of alternate compositions. As an example, tungsten inert gas (TIG) welding or laser welding can be used for joining metallic workpieces. When TIG welding a copper wire to a copper tab in a perpendicular arrangement, however, there is poor penetration (e.g., weld only at the upper surface) and the welds show poor fatigue performance and fail at relatively low load levels in uniaxial loading. When laser welding a copper wire and tab, the high thermal input paired with the high conductivity of copper leads to thermal damage of nearby insulation.

SUMMARY

A method of forming a weld interface between a first workpiece and a second workpiece includes arranging a reactive braze material at a first joining surface of the first workpiece. The reactive material is selected to react upon being heated to a temperature below the solidus temperature of the first and second workpieces to form a liquid-containing reaction product. Furthermore, an assembly is prepared of the first workpiece and the second workpiece with the first joining surface of the first workpiece and a second joining surface of the second workpiece separated by the reactive material. The second workpiece is then heated at an upper surface thereof with a first, green laser beam and at a lower surface thereof with a second, green laser beam. The first laser beam follows a first path and the second laser beam follows a second path that has a greater sweep dimension than the first path.

The method may be used to join workpieces made of metal or metal alloys of copper and may produce a solid-state welded joint between the first and second joining surfaces of the workpieces. Furthermore, the first workpiece may be an insulated wire that is provided in a perpendicular arrangement with the second workpiece so as to extend from the lower surface of the second workpiece, such that only the first path of the first laser beam heats the first workpiece. Additionally, the reactive material may comprise at least one metal element of copper, silicon, zinc, aluminum, or magnesium, or alloys thereof.

A method of forming a weld interface between a first workpiece and a second workpiece includes arranging a reactive braze material at a first joining surface of the first workpiece. The reactive material is selected to react upon being heated to a temperature below the solidus temperature of the first and second workpieces to form a liquid-containing reaction product. Furthermore, an assembly is prepared of the first workpiece and the second workpiece with the first joining surface of the first workpiece and a second joining surface of the second workpiece separated by the reactive material. The second workpiece is then heated at an upper surface thereof with a first, green laser beam and with a second, infrared laser beam. The first laser beam follows a first path and the second laser beam subsequently follows the first path. A weld bead is formed at a lower surface of the second workpiece in response to heat energy from the second laser beam.

Furthermore, both the first and second laser beams approach the assembly from the upper surface of the second workpiece.

A method of forming a weld interface between a first workpiece and a second workpiece includes arranging a reactive braze material at a first joining surface of the first workpiece. The reactive material is selected to react upon being heated to a temperature below the solidus temperature of the first and second workpieces to form a liquid-containing reaction product. Furthermore, an assembly is prepared of the first workpiece and the second workpiece with the first joining surface of the first workpiece and a second joining surface of the second workpiece separated by the reactive material. The second workpiece is then heated with a first laser beam following a first path and with a second laser beam following a second path. The first and second workpieces are metal or metal alloys of copper and the first laser beam is a green laser beam.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective view of an exemplary welded joint according to the present disclosure;

FIG. 2 is a perspective view of a copper wire with a reaction material of the exemplary welded joint of FIG. 1;

DETAILED DESCRIPTION

Figure 3:
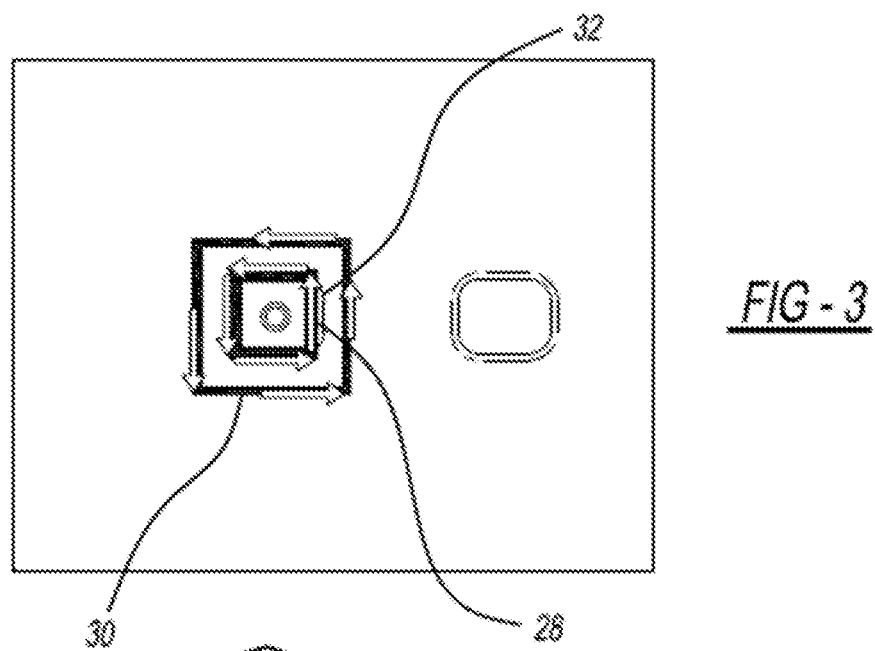
FIG. 3 is a schematic view of laser beam scanning paths for forming the exemplary welded joint of FIG. 1.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Laser welding is a metal joining process in which a laser beam is directed at a metal workpiece stack-up to provide a concentrated energy source capable of effectuating a weld joint between the constituent metal workpieces. In general, two or more metal workpieces are first aligned to form an intended weld site. A laser beam is then directed towards and impinges a top surface of at least one of the workpieces. The heat generated from the absorption of energy from the laser beam initiates melting of the metal workpieces down through the upper surface of the metal workpiece impinged by the laser beam and into the metal workpiece(s) at a predetermined depth depending on the power density of the laser used. If the power density of the laser beam is high enough, a keyhole is produced within the workpiece(s). A keyhole is a column of vaporized metal, which may include plasma derived from the metal workpiece(s). The keyhole is surrounded by molten workpiece metal and is an effective absorber of energy from the laser beam, thus allowing for deep and narrow penetration of molten workpiece metal compared to instances in which a keyhole is not present.

The laser beam melts the metal workpiece(s) in very short order once it impinges the top surface. After the metal workpiece(s) are initially melted, a beam spot of the laser beam may be moved across the top surface of the workpiece(s) along a predefined path. As the beam spot of the laser beam is advanced along the top surface, molten workpiece metal flows around and behind the advancing beam spot. This penetrating molten workpiece metal quickly cools and solidifies into resolidified composite metal workpiece material. Eventually, the transmission of the laser beam at the top surface of the workpiece is ceased, at which time the keyhole collapses and any molten workpiece metal that still remains solidified. The collective resolidified composite metal workpiece material obtained by directing the laser beam at the top surface of the workpiece and advancing the beam spot of the laser beam along a weld path constitutes a laser weld joint and serves to autogeneously fusion weld the metal workpieces together.

The method of this invention may be used, for example, in the welding of copper wires or bars during the assembly and making of a stator for an electric traction motor for driving one or more wheels of an automotive vehicle. The copper wires may, for example, have a thin oxide coating on their surfaces and may have a rectangular cross-section with flat sides of a few millimeters or so in width. The wires are fitted into insulator-lined slots on and around the full inner circumferences of the annular-shaped stack of stator discs. The end of a stator conductor wire is to be welded to a tab to provide, for example, closed electrical circuits for producing a three-phase electromagnetic field in the ferroelectric stator core for driving a rotor member located axially within a finished stator in operation of a traction motor. Notably, the invention can also be applied advantageously to many joining situations, including joints between bus bars, between electrical transformer components, and between resistance welding gun components. Although many such assemblies often consist primarily of nearly pure copper, this invention can be applied equally well to so-called high-copper (>96% Cu) alloys with 0-4% alloying elements such as Cd, Cr, Zr, Mg, Fe, P, Be, Co, S, Te, and Pb added individually or in combination to obtain improved mechanical properties, machinability, or other characteristics.

Referring now to FIG. 1, an exemplary laser welded joint workpiece 10 is shown having a first copper conductor member 12 in the form of a wire or bar of small rectangular cross-section and a second copper conductor member 14 in the form of a large rectangular tab. The welded joint workpiece 10 is formed by using a dual-beam pulsed green laser welding system having a first laser beam 16 directed to an upper surface 18 of the tab 14 and a second laser beam 20 directed to a lower surface 22 of the tab 14. While described as a dual-beam pulsed green laser, it should be understood that any type of welding device having a high absorptivity (e.g., >30%) can be used for the welding process. The dual-beam pulsed green laser welding device is, for example, a 532 nm green laser meeting absorptivity requirements. As such, absorption versus temperature is more constant. The method of welding workpieces, as described herein, may be beneficial for use in the automotive and aerospace manufacturing industries; the pulp and metal processing industries; the agricultural, military, appliance, construction, food and beverage, consumer products and medical service industries; and general manufacturing applications.

In the exemplary welded joint workpiece 10, the wire 12 is placed into contact with the tab 14 in a perpendicular arrangement so as to extend through a rectangular opening 24 in the tab 14. The wire 12 further includes a reactive metal braze or metal alloy portion 26 selected to assist in the welding process, as best shown in FIG. 2. The material portion 26 can also be a braze material suitable for copper brazing. The material portion 26 may be secured to the wire 12 through a welding process. It should be noted, however, that any known method for attaching the material portion 26 to the wire 12 can be used. The metallurgically reactive portion 26 forms a mobile liquid phase through reaction with a small amount of material from each of the facing copper workpiece surfaces under the influence of applied heat. The liquid phase of the reactive composition has a solidus temperature that is lower than the melting point of the workpiece metal. The mobile phase that is formed is capable of removing oxide films initially present on the copper workpiece surfaces to be joined. The intended function of the mobile phase is to remove such films that are an impediment to a copper surface-to-copper surface weld. The presence of the braze material allows formation of a sound joint even when there is insufficient energy to fully melt the copper at the bottom of the tab due to heat loss via thermal conduction through the tab.

In an illustrative embodiment of this invention, a thin metal strip of a suitable reactive material can be used for joining the substantially pure copper workpieces. The reactive material can be, for example, elemental aluminum, and/or zinc, alloys thereof, alloys of these with copper, alloys of copper-phosphorus, copper-silicon, or mixtures of these elements or alloys. One such suitable material for joining is an alloy of about seven percent by weight phosphorus and the balance copper. Copper has a melting point of 1084° C., while copper-7 wt. % phosphorus alloy has a melting temperature of 710° C. This copper-phosphorus alloy is capable of dissolving or fluxing the surface oxides present at the copper-to-copper workpiece interface, as well as, reacting with and dissolving a portion of the copper workpieces. Another suitable reactive metal composition for welding copper is an alloy of copper with, by weight, 6% phosphorus, 6% tin, and 0.4% silicon. Still another reactive metal composition for welding copper is an alloy of copper with, by weight, 15% silver and 5% phosphorus.

The process is conducted by placing a thin (e.g., 50 to 250 microns thickness) piece of the reaction material portion 26 on a facing surface of the copper workpiece to be joined. The joint is then heated to a temperature well above the solidus temperature of the metal/reactive metal alloy system, i.e., above 710° C. when using the copper-7% phosphorus alloy, but well below the melting point of copper, i.e., below 1084° C. The reaction material portion 26 can be conveyed to the joint area using the method discussed above. Alternatively, the reaction material portion 26 can be arranged on the tab 14 or the tab 14 could be precoated with the metallurgical additive. This could be done in a high volume process, such as screen printing or spray coating the additive particles, or pre-applying a thin foil of the additive using an adhesive to a surface of the tab 14. Furthermore, alternate forms such as foil, wire, mesh or weaves could also be used, although material forms with irregular geometry such as particles, wires or weaves may offer advantages over foil in some specific embodiments. Reactive material may be conveyed to the joint area manually or robotically as either a solid body or, particularly for particulate forms, entrained as a dispersion or a paste in a dispensable fluid which is either benign to the process or which will evaporate during processing.

With reference now to FIGS. 1 and 3, scanning paths 28, 30 of the dual-beam pulsed green laser welder are schematically depicted. The dual-beam laser provides an adjustable input energy to delay solidification at the lower surface 22 of the tab 14 in order to control liquid flow and avoid formation of porosity at a weld joint 32. At the upper surface 18 of the tab 14, the laser welding system provides the first laser beam 16 along the scanning path 28, which heats the workpieces 12, 14 from the top down. At the lower surface 22 of the tab 14, the laser welding system provides the second laser beam 20 along the scanning path 30, which heats only the workpiece 14 away from the wire 12. The scanning path 30 is provided at a greater sweep dimension than that of the scanning path 28. In this way, insulation 34 on the wire 12 is subjected to less heat than the tab 14 experiences during the welding process.

Figure 4:
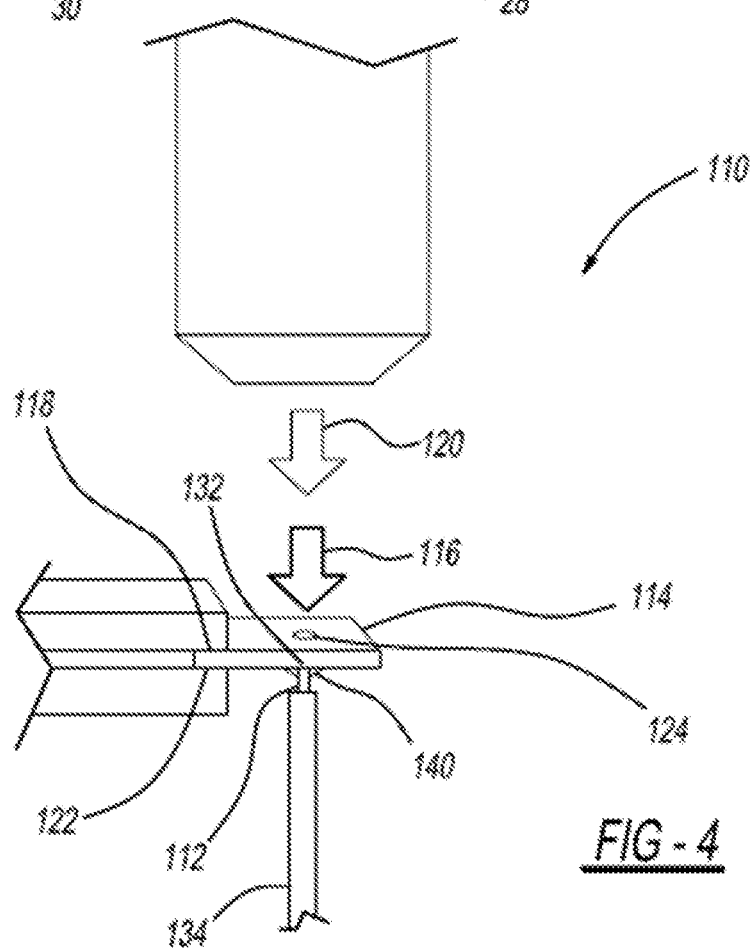
FIG. 4 is a perspective view of another exemplary welded joint according to the present disclosure.

With reference now to FIG. 4, another exemplary welded joint workpiece 110 is shown having a first copper conductor member 112 in the form of a wire or bar of small rectangular cross-section and a second copper conductor member 114 in the form of a large rectangular tab. Unlike the welded joint workpiece 10, the workpiece 110 is preassembled such that there is no access to the wire side of the tab and all welding must be completed from only the upper side of the tab. In this exemplary embodiment, the welded joint workpiece 110 is formed by using a hybrid-beam laser welding system having an initial low heat input using a green laser beam for providing a keyhole (e.g., to bring surface to melting temperature). An infrared laser beam follows the green beam to provide a higher energy input at an increased melting depth. The high energy input may control the molten pool to flow downward and fill any existing air gaps. It should be noted that the green beam can also be run concurrently with the infrared beam.

The wire 112 is placed into contact with the tab 114 in a perpendicular arrangement so as to extend through a rectangular opening 124 in the tab 114. The wire 112 further includes a reactive metal or metal alloy portion arranged at the wire side of the joint so as to cover the entire tab-wire interface, as previously described with respect to FIG. 2. The metallurgically reactive portion also behaves as previously described, and as such, will not be discussed in detail again. The paste-form reaction material is used to fill any air gaps between the wire 112 and the tab 114, and provides a joint fillet 140 in the final geometry of the welded joint workpiece 110.

Figure 5:
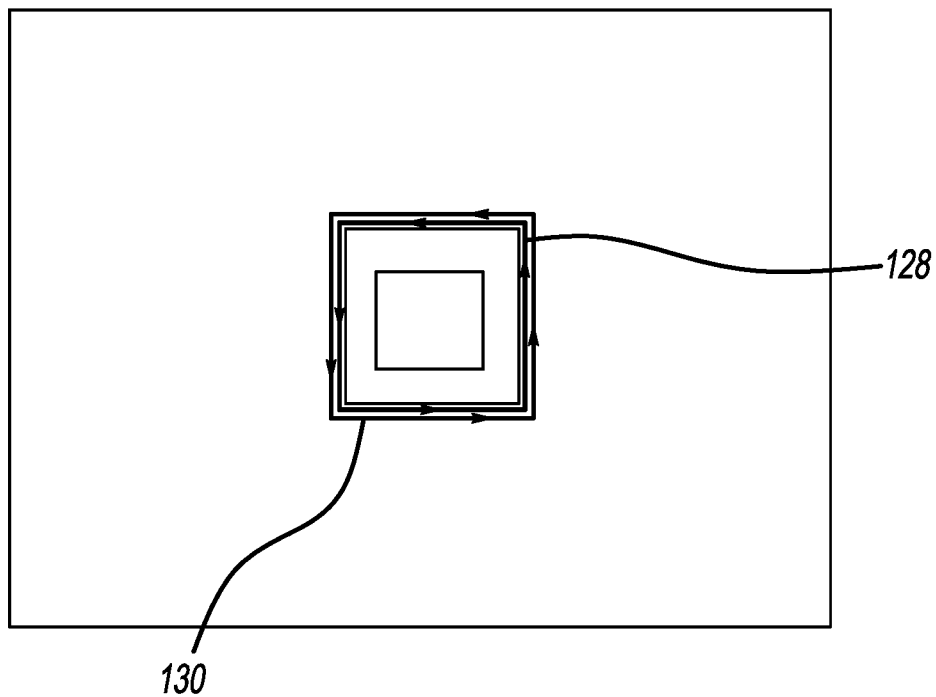
FIG. 5 is a schematic view of laser beam scanning paths for forming the exemplary welded joint of FIG. 4.

With reference now to FIG. 5, the scanning paths 128, 130 of the hybrid-beam laser welder are schematically depicted. The hybrid-beam laser provides an adjustable input energy to have a deeper melting depth in the joint, in order to get heat to the lower surface 122 of the tab 114 and create the natural fillet 140 between the wire 112 and the tab 114. The fillet 140 increases the fatigue strength of the joint 132 by adding material at the perpendicular interface.

At the upper surface 118 of the tab 114, the hybrid-beam laser welding system provides the first, green laser beam 116 along the scanning path 128, which heats the workpieces 112, 114 from the top down. After the scanning path 128 is completed, the laser welding system provides the second, infrared laser beam 120 along the scanning path 130, which has a deeper melting depth and heats the workpiece 114 through to the wire 112. The scanning path 130 is provided at the same sweep dimension as that of the scanning path 128 and from the same side as the first scanning path 128. In this way, insulation 134 on the wire 112 is not subjected to the heat that the tab 114 experiences during the welding process.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A method of forming a weld interface between a first workpiece and a second workpiece, the method comprising:
    arranging a reactive braze material at a first joining surface of the first workpiece, the reactive braze material being selected to react upon being heated to a temperature below the solidus temperature of the first and second workpieces to form a liquid-containing reaction product;
    preparing an assembly of the first workpiece and the second workpiece by placing the first workpiece into a rectangular opening in the second workpiece so that the first joining surface of the first workpiece and a second joining surface of the second workpiece are separated by the reactive braze material, and so that the first workpiece is provided in a perpendicular arrangement with the second workpiece;
    directly heating the second workpiece at an upper surface thereof with a first, green laser beam and directly heating only the second workpiece at a lower surface of the second workpiece with a second, green laser beam, wherein the first green laser beam follows a first weld path and the second green laser beam follows a second weld path, the second weld path has a greater weld path length than the first weld path; and
    delaying solidification of the liquid-containing reaction product at the lower surface of the second workpiece by adjusting an input energy of one or more of the first green laser beam and the second green laser beam, and wherein the first workpiece is an insulated wire.

2. The method of claim 1, wherein the first and second workpieces are metal or metal alloys of copper.

3. The method of claim 1, wherein the reactive material is at least one metal element of copper, silicon, zinc, aluminum, or magnesium, or alloys thereof.

4. The method of claim 1, further comprising forming a solid-state welded joint between the first and second joining surfaces.

5. The method of claim 1, wherein the first workpiece is joined at a T-joint with the second workpiece.

6. The method of claim 5, further comprising arranging the first workpiece to extend from the lower surface of the second workpiece, such that only the first weld path of the first laser beam directly heats the first workpiece.

7. A method of forming a weld interface between a first workpiece and a second workpiece, the method comprising:
arranging a reactive braze material at a first joining surface of the first workpiece, the reactive braze material being selected to react upon being heated to a temperature below the solidus temperature of the first and second workpieces to form a liquid-containing reaction product;
preparing an assembly of the first workpiece and the second workpiece placing the first workpiece into a rectangular opening in the second workpiece so that the first joining surface of the first workpiece and a second joining surface of the second workpiece are separated by the reactive braze material, and so that the first workpiece is provided in a perpendicular arrangement with the second workpiece;
directly heating the second workpiece at an upper surface thereof with a first, green laser beam and with a second, infrared laser beam, wherein the first green laser beam follows a first weld path and the second infrared laser beam subsequently follows the first weld path, and wherein a weld bead is formed at a lower surface of the second workpiece in response to heat energy from the second infrared laser beam; and
delaying solidification of the liquid-containing reaction product at the lower surface of the second workpiece by adjusting an input energy of one or more of the first green laser beam and the second infrared laser beam, and
wherein the first workpiece is an insulated wire.

8. The method of claim 7, wherein the first and second workpieces are metal or metal alloys of copper.

9. The method of claim 7, wherein the reactive braze material includes at least one metal element of copper, silicon, zinc, aluminum, or magnesium, or alloys thereof.

10. The method of claim 7, further comprising forming a solid-state welded joint between the first and second joining surfaces.

11. The method of claim 7, further comprising arranging the first workpiece to extend from the lower surface of the second workpiece and into the opening in the second workpiece, such that both the first and second laser beams approach the assembly from the upper surface of the second workpiece.

12. A method of forming a weld interface between a first workpiece and a second workpiece, the method comprising:
arranging a reactive braze material at a first joining surface of the first workpiece, the reactive braze material being selected to react upon being heated to a temperature below the solidus temperature of the first and second workpieces to form a liquid-containing reaction product;
preparing an assembly of the first workpiece and the second workpiece by placing the first workpiece into a rectangular opening in the second workpiece so that the first joining surface of the first workpiece and a second joining surface of the second workpiece are separated by the reactive braze material, and so that the first workpiece is provided in a perpendicular arrangement with the second workpiece;
directly heating the second workpiece with a first laser beam following a first weld path and with a second laser beam following a second weld path, wherein the first and second workpieces are metal or metal alloys of copper, and wherein the first laser beam is a green laser beam; and
delaying solidification of the liquid-containing reaction product at a lower surface of the second workpiece by adjusting an input energy of one or more of the first laser beam and the second laser beam, and
wherein the first workpiece is an insulated wire.

13. The method of claim 12, wherein the reactive braze material includes at least one metal element of copper, silicon, zinc, aluminum, or magnesium, or alloys thereof.

14. The method of claim 12, further comprising forming a solid-state welded joint between the first and second joining surfaces.

15. The method of claim 12, further comprising arranging the first workpiece to perpendicularly extend from the lower surface of the second workpiece, and wherein the first laser beam approaches the assembly from the upper surface of the second workpiece and the second laser beam approaches the assembly from the lower surface of the second workpiece.

16. The method of claim 12, further comprising arranging the first workpiece to perpendicularly extend from the lower surface of the second workpiece, and wherein both the first and second laser beams approach the assembly from the upper surface of the second workpiece.

* * * * *